Dec. 1, 1959   G. A. WILLIAMS   2,914,881
FISHING KIT
Filed Oct. 23, 1956
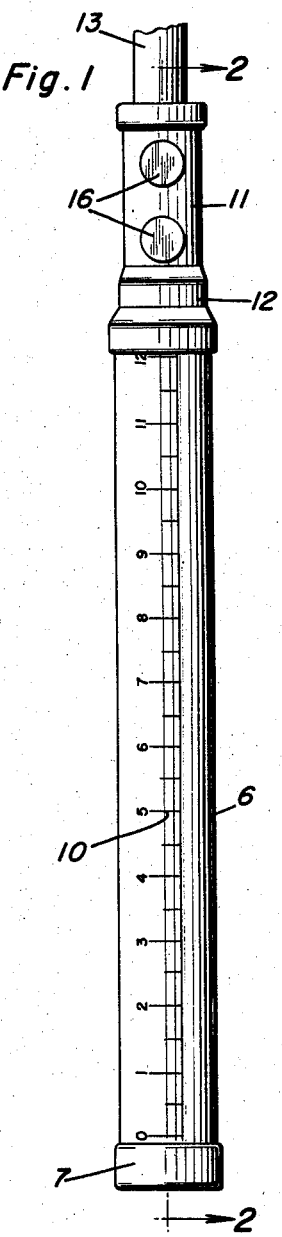
Fig. 1
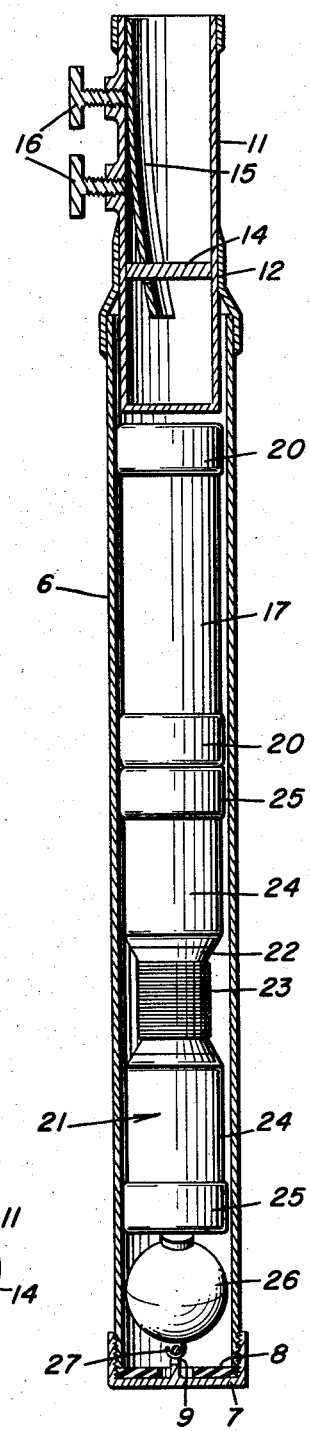
Fig. 2
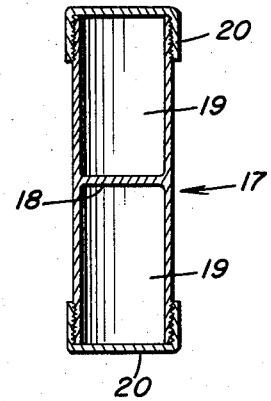
Fig. 4
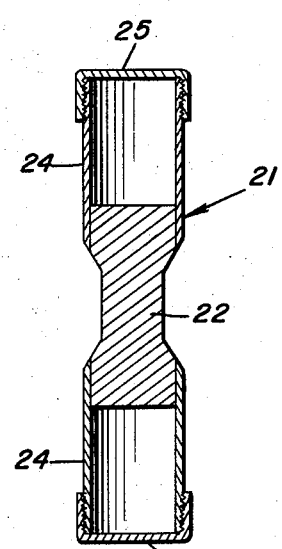
Fig. 5
Fig. 3
George A. Williams
INVENTOR.
BY *Clarence A. O'Brien*
*and Harvey B. Jackson*
Attorneys

2,914,881
FISHING KIT

George A. Williams, Ragley, La.

Application October 23, 1956, Serial No. 617,843

1 Claim. (Cl. 43—23)

The present invention relates to new and useful improvements in fishing kits, and has for one of its important objects to provide a device of this character which is adapted to be expeditiously and removably attached to various sizes of cane poles in a manner to function as a handle.

Another very important object of the invention is to provide, in a manner as hereinafter set forth, a kit of the aforementioned character which comprises substantially all the tackle usually required by a cane pole fisherman, such as a line, float, hooks, sinkers, snaps, swivels, etc.

Other objects of the invention are to provide a fishing kit of the character described which will be comparatively simple in construction, strong, durable, compact, light in weight, attractive in appearance, and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of a fishing kit constructed in accordance with the present invention;

Figure 2 is a view in vertical section through the device, taken substantially upon the line 2—2 of Figure 1;

Figure 3 is an end view;

Figure 4 is a detail view in vertical section through one of the removable inner tackle containers; and Figure 5 is a view in vertical section through the combination line spool and tackle container.

Referring now to the drawing in detail, it will be seen that the embodiment of the invention which has been illustrated comprises a tubular outer container or handle 6 of suitable metal, which handle may be of any desired length and diameter. One end of the tubular handle 6 is closed by a removable screw cap 7 having a sealing gasket 8 therein. The cap 7 also includes, on the interior thereof, an eye 9, the purpose of which will be presently set forth. As illustrated to advantage in Figure 1 of the drawing, the tubular handle 6 is provided with a longitudinally extending fish measuring scale 10.

The other end of the tubular handle 6 is closed by a socket 11 of suitable metal which is mounted in a reducer 12. It will be observed that the socket 11 extends through the reducer 12 into the handle 6, said reducer being fixed on said handle. The socket 11 is for the reception of one end portion of various sizes of cane poles, as at 13. Toward this end, the socket 11 has fixed diametrically in the lower portion thereof a pin 14. A longitudinally curved metallic clamping jaw 15 of arcuate cross-section is loosely mounted on the pin 14. Thumb screws 16 are threadedly mounted in the socket 11 and engageable with the jaw 15 for clamping said jaw on the pole 13.

The tubular handle 6 is for the recepiton of a removable tackle container 17. The container 17 is of cylindrical form and comprises, at an intermediate point, a partition 18 dividing said container into compartments 19 for the reception of hooks, sinkers, etc. Caps 20 close the compartments 19.

The tubular handle 6 also accommodates a removable container 21. The container 21 includes, at an intermediate point, a spool 22 on which a line 23 is wound. Mounted on the end portions of the spool 22 and projecting longitudinally therefrom are substantially cylindrical compartments or containers 24 for the reception of fishing tackle, said containers 24 being provided with removable end caps 25.

The tubular handle 6 still further is adapted to accommodate a fishing float 26. The float 26 includes the usual hook 27 which is engaged in the eye 9 for connecting said float to the cap 7 for removal therewith from the handle 6.

It is thought that the use of the kit will be readily apparent from a consideration of the foregoing. Briefly, a suitable pole, as at 13, is inserted in the socket 11 and firmly secured by tightening the thumb screws 16 on the jaw 15. The construction and arrangement, it will be observed, is such that poles of various sizes may be firmly clamped in the socket 11. As hereinbefore stated, when the screw cap 7 is removed, the attached float 26 is removed therewith. The containers 21 and 17 will now slip by gravity out of the tubular handle 6.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claim.

What is claimed as new is as follows:

A fishing kit of the character described comprising a tubular handle open at one end for the reception of tackle, a socket in the other end portion of the handle for the reception of a fishing pole, a stationary pin traversing said socket and providing a stop for the pole, an elongated longitudinal curved jaw of arcuate cross section loosely mounted on said pin and operable in the socket for engagement with said pole, the portion of said jaw on said pin extending inwardly toward the center of said socket for providing a seat for said pole, and thumb screws threadedly mounted in the socket and engaging said jaw for clampingly engaging said jaw and a portion of said socket opposite said jaw with the pole.

References Cited in the file of this patent
UNITED STATES PATENTS

| | | |
|---|---|---|
| 10,795 | De Saxe | Apr. 18, 1854 |
| 461,106 | Oberly | Oct. 13, 1891 |
| 986,268 | Colina et al. | Mar. 7, 1911 |
| 2,194,386 | Dunaway | Mar. 19, 1940 |
| 2,438,388 | Dolk | Mar. 23, 1948 |
| 2,548,351 | Coombs | Apr. 10, 1951 |
| 2,643,146 | Morse | June 23, 1953 |
| 2,667,009 | Bear | Jan. 26, 1954 |
| 2,744,353 | Adams | May 8, 1956 |